United States Patent
Xiong et al.

(10) Patent No.: US 11,726,163 B2
(45) Date of Patent: Aug. 15, 2023

(54) POSITION DETECTION OF USER EQUIPMENT WITHIN A WIRELESS TELECOMMUNICATION NETWORK

(71) Applicant: Nokia Technologies Oy, Espoo (FI)

(72) Inventors: Zhilan Xiong, Bristol (GB); David Bhatoolaul, Bristol (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 189 days.

(21) Appl. No.: 16/323,444

(22) PCT Filed: Aug. 10, 2017

(86) PCT No.: PCT/EP2017/070370
§ 371 (c)(1),
(2) Date: Feb. 5, 2019

(87) PCT Pub. No.: WO2018/029319
PCT Pub. Date: Feb. 15, 2018

(65) Prior Publication Data
US 2019/0178976 A1    Jun. 13, 2019

(30) Foreign Application Priority Data
Aug. 12, 2016 (EP) ..................... 16183944

(51) Int. Cl.
*H04W 64/00* (2009.01)
*G01S 5/02* (2010.01)
*G01S 1/20* (2006.01)
*G01S 1/04* (2006.01)
*H04B 1/713* (2011.01)

(52) U.S. Cl.
CPC ......... *G01S 5/0215* (2013.01); *G01S 1/0423* (2019.08); *G01S 1/20* (2013.01); *H04B 1/713* (2013.01); *H04W 64/00* (2013.01)

(58) Field of Classification Search
CPC ... H04W 64/00; H04W 72/042; H04W 72/12; H04W 88/02; H04W 56/001;
(Continued)

(56) References Cited

U.S. PATENT DOCUMENTS

2005/0255878 A1\* 11/2005 Leinonen ............... H04B 15/00
455/552.1
2010/0322227 A1    12/2010 Luo
(Continued)

FOREIGN PATENT DOCUMENTS

CN         103684724 A     3/2014
JP         2003-207557 A   7/2003
(Continued)

OTHER PUBLICATIONS

Sven Fischer, "Observed Time Difference of Arrival (OTDOA) Positioning in 3GPP LTE," 2014 Qualcomm Technologies, Inc., XP055284784, pp. 1-62, Jun. 6, 2014.
(Continued)

*Primary Examiner* — Quan M Hua
(74) *Attorney, Agent, or Firm* — Lippes Mathias LLP

(57) ABSTRACT

The position detection of user equipment within a network, and the corresponding methods performed at the network node, user equipment and location server are disclosed, along with these entities and a computer program. The method performed at the network node comprises within a position reference signal time period, broadcasting: a first position reference signal within a first frequency band and during a first time period; and at least one further position reference signal within at least one further frequency band and during at least one subsequent time period, said at least one further frequency band being different to said first frequency band.

8 Claims, 3 Drawing Sheets

(58) Field of Classification Search
CPC ... H04W 56/002; H04W 64/003; H04W 4/02; H04W 8/12; H04W 8/205; H04L 5/0048; H04L 5/0053; H04L 1/1607; H04L 1/18; H04L 5/0005; H04L 5/005; H04B 1/713
See application file for complete search history.

(56) References Cited

U.S. PATENT DOCUMENTS

| | | |
|---|---|---|
| 2012/0027110 A1 | 2/2012 | Han et al. |
| 2012/0276916 A1 | 11/2012 | Kazmi et al. |
| 2015/0289236 A1* | 10/2015 | Seo ................. H04W 72/23 370/335 |
| 2015/0296359 A1* | 10/2015 | Edge ..................... G01S 1/20 455/404.2 |
| 2018/0098314 A1* | 4/2018 | Rico Alvarino ...... H04W 72/23 |

FOREIGN PATENT DOCUMENTS

| | | |
|---|---|---|
| KR | 2010-0113036 | 10/2010 |
| WO | WO 2015/138178 A | 9/2015 |
| WO | WO 2016-036840 A1 | 3/2016 |
| WO | WO 2018/019365 A1 | 2/2018 |

OTHER PUBLICATIONS

International Search Report for PCT/EP2017/070370 dated Sep. 27, 2017.

* cited by examiner

POSITION DETECTION OF USER EQUIPMENT WITHIN A WIRELESS TELECOMMUNICATION NETWORK

FIELD OF THE INVENTION

The field of the invention relates to the position detection of user equipment within a wireless telecommunication network.

BACKGROUND

OTDOA or observed time difference of arrival is a downlink positioning method used in networks for detecting a user equipment's position. In particular, network nodes transmit PRS position reference signals and these are detected by user equipment UE. The time of arrival of the different signals at the user equipment and in particular, the RSTD reference signal time difference measurement at the user equipment can be used as an indication of the UE's location.

The PRS signal is delivered with a predefined bandwidth and a set of configuration parameters such as periodicity, duration and subframe offset. The PRS are broadcast in predefined positioning subframes grouped by several consecutive subframes which form predefined time periods termed PRS occasions. These recur periodically. In addition, the network node may be configured for time based blanking so-called PRS muting in which periods the PRS signal is muted, allowing signals from other network nodes involved in the OTDOA to be more easily detected by the user equipment.

Different user equipment have different properties and in particular, there are low complexity or machine type (eMTC) user equipment and NB-IoT (narrowband internet of things) user equipment each of which have narrowband transceivers. When transmitting signals it is known that a larger bandwidth will provide higher accuracy. The current recommended PRS configuration for product implementation are for a 10 MHZ bandwidth, a 160 ms period for transmitting the PRS, with 1 PRS subframe or block per PRS occasion or time period. Where the bandwidth is lower, for example 1.4 MHZ for a MTC UE then 6 PRS subframes per occasion are recommended. However, although the sampling numbers increase, the bandwidth is still 1.4 MHz and even with this increased number of subframes the required positional accuracy may not be met.

It would be desirable to be able to increase the accuracy of positional measurement for user equipment without undue resources.

SUMMARY

A first aspect provides a method performed at a network node comprising, within a position reference signal time period, broadcasting: a first position reference signal within a first frequency band and during a first time period; and at least one further position reference signal within at least one further frequency band and during at least one subsequent time period, said at least one further frequency band being different to said first frequency band.

The inventors of the present invention recognised that the limited bandwidth of some user equipment restricted the ability of the user equipment to accurately determine the time of arrival of position reference signals. They also recognised that although traditionally this had been addressed by transmitting these reference signals over a larger number of time blocks or subframes, this increased the resources used and yet the accuracy was still limited. They recognised that accuracy could be improved if the repeat transmissions of these signals were made in different frequency ranges. By broadcasting signals in this way the bandwidth of the overall signal is increased. This can be particularly advantageous where individual signals or signal blocks are broadcast within a narrow bandwidth which conserves resources and makes them suitable for receipt by correspondingly limited bandwidth transceivers. Broadcasting such signals at different frequencies increases the overall bandwidth without requiring the bandwidth of individual signals to be increased. Thus, accuracy can be increased while conserving resources.

Where the bandwidth of the individual PRS signals broadcast is reduced compared to conventional bandwidths for these signals, the shifting of frequency range could be achieved while still maintaining the broadcast signals within a frequency range reserved for these conventional PRS signals. In this regard, the inventors also recognised that for low bandwidth UEs the broadcast across a wide bandwidth wasted resources, and that the same result could be achieved for these UEs if the signal were transmitted across a narrower bandwidth where the bandwidth corresponded to the bandwidth of the UE's transceivers. By using a subset of the frequency band generally reserved for such PRS signals the frequency range that the signals were broadcast in could be varied while still remaining within the frequency band conventionally provided for PRS signalling, and in this way accuracy could be improved if the repeat transmissions of these signals were made in different frequency ranges. In this way although each individual signal might be transmitted or broadcast in a lower frequency bandwidth, multiple signals are received across different frequencies and thus, the increase in accuracy associated with wider band signals is provided. The wider bandwidth may be between 10 and 20 MHZ, preferably 10 MHZ and the narrowband may be 2 MHZ or less, preferably between 1 and 2 MHZ, preferably 1.4 MHZ or in some embodiments between 100 and 300 KHZ, preferably 180 KHZ.

Furthermore, although particularly effective for determining the location of narrowband user equipment, this method also has advantages when used with other user equipment. These arise because the time frequency resources used for the broadcast of PRS signals are reserved for these signals, and by using narrower frequency bands a reduced amount of resource is used. With narrowband UEs resources are saved and accuracy is unaffected. With wider band UEs, resources are saved and although accuracy may be decreased, the use of frequency hopping between signals mitigates this to some extent.

The position reference signal transmitting period is the period of time or number of subframes during which the position reference signals are transmitted. It may be termed the position reference signal occasion. In this regard the position reference signal time period periodically repeats, such that position reference signals are broadcast as a repeating periodic pattern within a periodically repeating position reference signal time period.

Position reference signals are transmitted during each PRS time period or occasion during one or multiple PRS subframes generally 1, 2, 4 or 6 and the period of repetition of the PRS time periods or occasions can be set to a particular value, such as 160 m/s, 320 m/s, 640 m/s or 1,280 m/s. One PRS pattern in the timeframe could include 2, 4, 8 or 16 PRS occasions for example.

Although in some embodiments only one further position reference signal within one further frequency band and during one subsequent time period is broadcast in this PRS time period, in other embodiments, the method comprises broadcasting a plurality of further position reference signals within said position reference signal time period.

In some embodiments said plurality of further position reference signals and said first position reference signals are broadcast in different non-overlapping frequency bandwidths and time periods, while in other embodiments some of the signals may overlap in frequency where they do not overlap in time. In some embodiments, each time period may contain more than one position reference signal and in this case position reference signals within a same time period will not overlap in frequency. Where a time period contains multiple position reference signals, different narrowband UEs will receive configuration information for a particular one of the multiple position reference signals by indicating that particular frequency band. Wider band user equipment may receive configuration information that encompasses several or all of the multiple position reference signals within each time period, allowing them to receive all of the signals and increasing their accuracy.

In some embodiments during said position reference signal time period, position reference signals may be transmitted continuously one after the other, while in other embodiments, said method further comprises generating a time gap between broadcast of said position reference signals by not broadcasting a position reference signal during a time period immediately subsequent to at least one broadcast of said position reference signals.

It may be advantageous to leave a time gap between broadcast of the position reference signals where frequency hopping is involved as the user equipment receiving the signals will need to change the frequency bandwidth of the receiver to compensate for the frequency change in the position reference signals and as such, providing a time delay may enable the user equipment to perform this action in good time to receive this signal.

In some embodiments, said time period and said at least one subsequent time period have a same magnitude and comprise an integer number of downlink sub frames.

Although the time periods during which the position reference signals or position reference signal blocks are broadcast may differ in size, it may be advantageous for them to be the same size and to comprise an integer number of downlink subframes. In this way, the patterns are easier to define and the information and resources used are standard for each PRS block.

In some embodiments, said at least one further frequency band has a predetermined bandwidth, and adjacent position reference signals in time are remote from each other in frequency by at least one of said predetermined bandwidth.

In some cases, it may be advantageous if the position reference signals that are transmitted closest to each other in time are not close to each other in frequency, that is they do not form adjacent frequency bandwidths but are remote from each other by at least one of the predetermined frequency bandwidths. This allows for an increased overall bandwidth of the signals that are transmitted and may reduce interference effects.

In some embodiments, one of said frequency bands comprises a wider bandwidth than said predetermined bandwidth, said other frequency bandwidths being encompassed within said wider frequency bandwidth.

Although in some embodiments all of the frequency bands have the same bandwidth, in other embodiments one of the frequency bandwidths is larger than other frequency bandwidths and in fact the other frequency bandwidths will lie within it.

Legacy user equipment are configured to monitor position reference signals within a wide frequency band and in some embodiments, it may be advantageous to support the operation of legacy user equipment as well as user equipment configured to operate according to embodiments of the present invention. Thus in such a case, providing one, perhaps the first position reference signal in a wider bandwidth enables these legacy equipment to receive and respond to this signal as they did for a legacy equipment. User equipment according to embodiments of the invention can receive this wider band signal either across its bandwidth or within a subset of the bandwidth depending on the bandwidth of its receiver. This wider bandwidth may be 10 MHZ with the narrower bandwidth corresponding to a bandwidth of Narrowband UEs, perhaps being 1.4 MHZ.

In some embodiments, said method comprises: within said position reference signal time period, broadcasting: during said first time period a further first position reference signal within a further first frequency band that is different to said first frequency band; and during said at least one subsequent time period at least one additional position reference signal within at least one additional frequency band, said at least one additional frequency band being different to said further first and said at least one further frequency band.

Although in some embodiments each time period may transmit a single position reference signal within a particular frequency band, in some embodiments each time period may contain multiple position reference signals within different frequency bands. Narrowband user equipment will be sent configuration information that indicates a frequency time resource of one of these signals, which they may therefore receive and respond to, while wider band user equipment may receive configuration information regarding several or all of the frequency bands of the different signals in each time period and in which case they can receive and respond to multiple signals and thereby improve their performance.

In some embodiments, said method further comprises transmitting position reference signal configuration information to a location server, said position reference signal configuration information comprising an indicator of a pattern of frequency locations of said position reference signals broadcast within said position reference signal time period.

In some embodiments, the network node transmits position reference signal configuration information indicating when and in what frequency band it is transmitting the position reference signals and this information is sent by the location server to the user equipment. The location server may be on the network node itself or it may be remote from it. When the location server transmits the configuration information to the user equipment it may transmit it via the network node. The network node will not however decode this information and as such will simply transmit it further.

In some embodiments, the indicator may comprise an indication of a position in a table, the location server and the network node storing corresponding tables with frequency patterns stored within them, the indicator indicating a location in the table and therefore a corresponding frequency pattern. Alternatively, the indicator may indicate the initial frequency of the first frequency band, the width of the frequency band and the offset for the frequency hopping between the different PRS blocks. In any case the indicator provides an indication of the frequency bands that the position reference signals should be broadcast within.

In some embodiments, said network node is operable to transmit a muting pattern to said location server, said muting pattern corresponding to a pattern of position reference signals broadcast by a further network node and indicating corresponding time and frequency resources where said network node does not broadcast any position reference or transmit data signals.

In some embodiments, said method further comprises not broadcasting data or position reference signals during a muting time period and a muting frequency band. The muting time period and the muting frequency band correspond to the broadcast pattern for position reference signals of a further, generally neighbouring network node.

In some embodiments, said position reference signal configuration information comprises a frequency position of an earliest one of said position reference signals comprising said predetermined bandwidth.

As an alternative to using a table of frequency locations, the position of the first position reference signal that has the predetermined bandwidth may be transmitted along with an offset position of subsequent signals. In this regard the first position reference signal may be a wideband legacy type signal, in which case the first position reference signal with the predetermined bandwidth will be the second one.

In some embodiments, said reference signal configuration information includes at least one of: frequencies where position reference signals are broadcast in said first time period where said first time period comprises multiple position reference signals; a number of subframes for each of said physical reference signal blocks; a number of subframes forming a gap between broadcast of adjacent position reference signals within said position reference signal time period; and a frequency offset between adjacent in time PRS blocks.

A second aspect of the present invention provides a method performed at a location server, said method comprising: receiving position reference signal configuration information from a network node for at least one user equipment, said position reference signal configuration information comprising: an indication of a position reference signal time period during which a plurality of position reference signals are to be broadcast; an indication of a first frequency band and a first time period for broadcasting a first of said position reference signals; and an indication of at least one further frequency band and at least one further time period for broadcasting at least one further of said position reference signals, said at least one further frequency band being different to said first frequency band; and transmitting said position reference signal configuration information towards said user equipment.

A location server may be provided for determining the location of the user equipment from responses to the position reference signals received at the user equipment. The location server will receive configuration information regarding these signals from the network node and will forward this to the user equipment. From such information and from the user equipment responses, it can determine the position of the user equipment.

In some embodiments, said position reference signal configuration information comprises an indication of a number of times within said position reference signal time period said position reference signal is to be broadcast and a time gap between said broadcasts.

The position reference signal configuration information contains information regarding the transmission of these position reference signals and may include the number of times these signals are transmitted and the time gap between the broadcast where there is a time gap. It may also comprise a repetition periodicity indicating a time period of repetition of said position reference signal time period.

The configuration information received at the location server may comprise information for plural user equipment, the location server directing transmissions containing relevant configuration information to particular user equipment. In this regard, different user equipment have different properties and thus, the configuration information suitable to the properties of particular user equipment may be directed towards that user equipment.

A third aspect of the present invention provides a method performed at a user equipment, said method comprising: receiving position reference signal configuration information from a location server, said position reference signal configuration information comprising: an indication of a position reference signal time period during which a plurality of position reference signals are to be broadcast from a network node, an indication of a first frequency band and a first time period within which a first of said position reference signals is to be broadcast, and an indication of at least one further frequency band and at least one further time period within which at least one further of said position reference signals is to be broadcast, said at least one further frequency band being different to said first frequency band; monitoring said first and said at least one further frequency bands during said indicated time periods for said position reference signals; and transmitting a response to receipt of said position reference signals towards said network node.

At the user equipment, there is a requirement to know when the position reference signals are being transmitted and in which frequency bands so that the user equipment is able to monitor and receive these signals. Thus, position reference signal configuration information is transmitted to and received at the user equipment, allowing them to monitor the required frequency bands during the required time periods and on receipt of the PRS transmit responses to them.

In some embodiments, said method further comprises receiving a plurality of position reference signal configuration information from at least one location server, each configuration information relating to a different network node; monitoring each of said first and said at least one further frequency bands during said indicated time periods for said position reference signals from each of said network nodes; and transmitting towards said network nodes an indication of a time of receipt of each of said received position reference signals.

In order to determine a location of the user equipment, it should receive position reference signals from several network nodes and it is the comparison of the time of receipt of these signals at the user equipment which allows the location server to determine its location. Thus, each network node will transmit position reference signals on a different frequency band and at a different time and the responses from the user equipment and in particular, the indicated time delays between receipt of these signals at the UE can be used to determine the UE's position.

In some embodiments, said position reference signal configuration information further comprises an indication of a further first frequency band within which said position reference signal is to be broadcast within said first time period, and an indication of at least one additional frequency band within which one of said position reference signals is to be broadcast within said at least one further time period, said method comprising: monitoring each of said first, said further first, said at least one further and said at least one additional frequency bands during said indicated time periods for said position reference signals.

Where the user equipment is a wider band user equipment suitable for measuring across several of the frequency bands, then the configuration information may contain information regarding plural frequency bands within each time period where position reference signals are transmitted. The user equipment may then monitor each of these and transmit a response thereby improving its accuracy.

In other embodiments, said user equipment is a low complexity user equipment with a narrowband transceiver, a bandwidth of said first and said at least one further frequency band each having a bandwidth equal to a bandwidth of said narrowband transceiver.

Where the user equipment is a low complexity user equipment with a narrowband transceiver then this narrowband transceiver has a bandwidth that is equal to or at least similar to the bandwidth of the position reference signals transmitted by the network node. Thus, in such a case it will tune its receiver to the indicated frequency range during the indicated time period and will be able to receive the position reference signal and respond to it. In this regard, examples of conventional user equipment include wideband user equipment receiving signals in a 10 MHZ band, narrower band user equipment such as MTC user equipment which operate in a 1.4 MHZ band and very narrow user equipment operating in a 180 KHZ band for example. Thus, where the PRS signals have been adapted for 180 KHZ UEs and the bandwidths used for the signals are of this order, then both a 1.4 MHZ UE and a 10 MHZ UE may be able to receive multiple signals at different frequencies in a same time period depending on the frequencies used. Where the frequency bandwidth used is adapted for a 1.4 MHZ UE then only the 10 MHZ UE will be able to receive multiple signals at different frequencies within one time period.

A fourth aspect of the present invention provides a computer program which when executed by a processor is operable to control said processor to method according to any one of a first, second or third aspect to the present invention.

A fifth aspect of the present invention provides a network node operable to broadcast position reference signals, said network node comprising: control circuitry for controlling broadcast of signals from a transmitter, said control circuitry being configured to control said transmitter to broadcast position reference signals within a position reference signal time period, said position reference signals comprising: a first position reference signal within a first frequency band and during a first time period; and at least one further position reference signal within at least one further frequency band and during at least one subsequent time period, said at least one further frequency band being different to said first frequency band.

A sixth aspect of the present invention provides a location server comprising: a receiver for receiving position reference signal configuration information from a network node for at least one user equipment, said position reference signal configuration information comprising: an indication of a position reference signal time period during which a plurality of position reference signals are to be broadcast; an indication of a first frequency band and a first time period for broadcasting a first of said position reference signals; and an indication of at least one further frequency band and at least one further time period for broadcasting at least one further of said position reference signals, said at least one further frequency band being different to said first frequency band; and a transmitter for transmitting said position reference signal configuration information towards said user equipment.

A seventh aspect of the present invention provides a user equipment comprising a receiver for receiving position reference signal configuration information from a location server, said position reference signal configuration information comprising: an indication of a position reference signal time period during which a plurality of position reference signals are to be broadcast from a network node, an indication of a first frequency band and a first time period within which a first of said position reference signals is to be broadcast, and an indication of at least one further frequency band and at least one further time period within which at least one further of said position reference signals is to be broadcast, said at least one further frequency band being different to said first frequency band; said user equipment further comprising control circuitry for controlling said receiver to monitor said first and said at least one further frequency bands during said indicated time periods for said position reference signals; and to transmit a response to receipt of said position reference signals towards said network node.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 1:
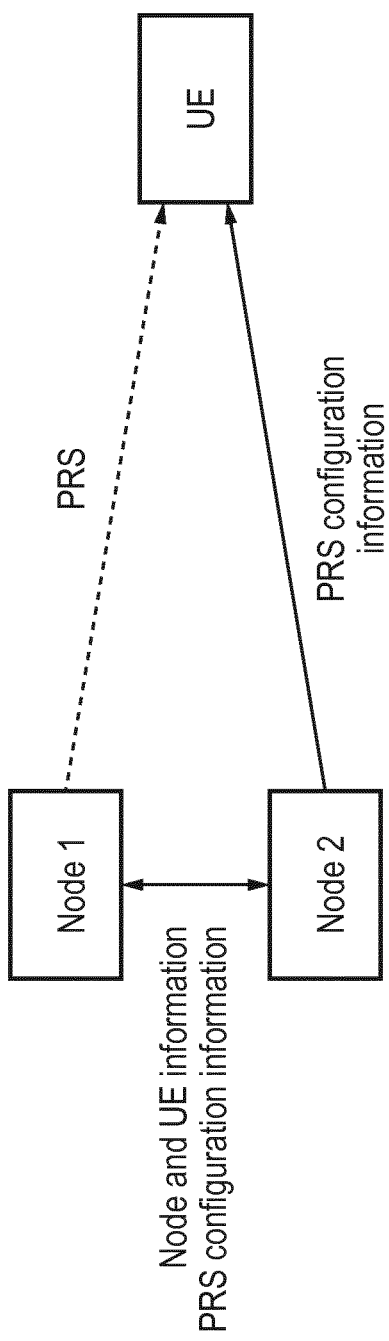
FIG. 1 schematically shows a network node location server and user equipment and information that they transmit according to an embodiment.

Before discussing the embodiments in any more detail, first an overview will be provided.

Position reference signals are transmitted as multiple PRS blocks within a time period sometimes denoted as a PRS occasion. The transmission of these signals within this time period is repeated periodically a predetermined number of times. Conventionally the PRS signal has been broadcast across a relatively wide frequency band conventionally 10 MHZ and in some cases across multiple subframes. In order to avoid interference with neighbouring nodes there may be a muting pattern so that for some of the occasions or time periods in the periodic repeating pattern rather than transmitting the PRS signals the network node will be muted such that in the time frequency resources where the PRS signals are broadcast no PRS and no data signals will be broadcast, leaving this PRS time frequency resource available for other network nodes to transmit their PRS signals within.

A drawback of the above technique has been that even in the case of narrowband user equipment which can only monitor a subset of the frequency block, the whole frequency block is reserved for the PRS signals and thus, resources are wasted. Embodiments have sought to address this by reserving a narrower frequency band for the transmission of the PRS signals. In order to address the decrease in accuracy associated with reducing the bandwidth of a signal, frequency hopping is used such that multiple PRS blocks are transmitted in different subframes within a PRS occasion each being transmitted in a different frequency range.

Thus, the broadcast of a first PRS block may be within one of the subframes of the PRS occasion or time period and across a frequency range which is a subset of the frequency range conventionally reserved for this signal. In a later subframe, the subsequent PRS block is broadcast but in a different frequency range although still within the conventional frequency range. This change in frequency range means that the position reference signal received at the user equipment is received across two different frequencies and this increases the frequency bandwidth of the received signal and improves the accuracy with which it can be measured. This frequency hopping can be repeated multiple times. Thus, PRS blocks with a reduced frequency bandwidth compared to conventional blocks, but which are broadcast at different frequencies are used.

Furthermore, where a muting pattern is used it is only required to match the pattern of the broadcast PRS blocks and therefore where broadcast is across a reduced narrower bandwidth, muting is also only across this reduced bandwidth.

In some embodiments a time period gap of a subframe or more between PRS blocks is provided where no PRS signals are broadcast and this allows the user equipment to adjust the frequency of its receiver to receive the subsequent PRS block at the different frequency and this may improve performance.

In some cases, legacy user equipment may also be supported and in such a case one of the time periods during which the frequency blocks are transmitted will have a wider frequency range. This is generally the first position reference signal within the position reference time period.

In summary, the solution proposed has a potential to use a reduced bandwidth for OTDOA PRS signals, without an undue decrease in accuracy. It has the potential to provide high positioning accuracy while using fewer resources.

One example of the network structure discussed in this application for PRS transmission and configuration information exchange in OTDOA is shown in FIG. 1, where Node 1 (for example eNB) and Node 2 (for example a location server) share the Node and UE information as well as the PRS configuration information generally using the backhaul link. Note that Node 1 and Node 2 might be in one device or different devices.

Node 2 transmits the PRS configuration information of PRS signals broadcast to the UE from node 1. This allows the UE to measure PRS signals broadcast from node 1. Node 2 may transmit the PRS configuration via node 1, however node 1 will not decode or be aware of the information.

Node 1 broadcasts the PRS signalling and the UE performs PRS measurements.

The UE will transmit the measured signals back to node 1 which will pass them to node 2. Node 2 will receive responses from the UE to different PRS signals received from different nodes and will be able to determine the UE position from these signals.

Figure 2:
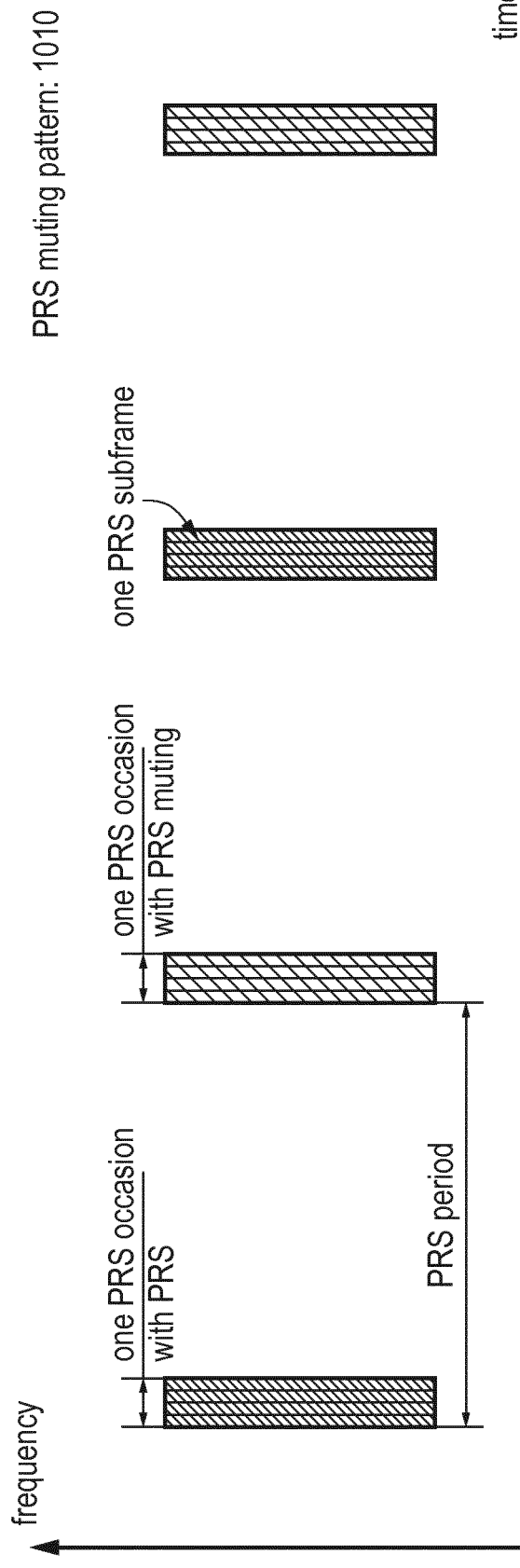
FIG. 2 schematically shows PRS transmission and muting according to the prior art.

In the conventional solution, PRS is broadcast across the whole bandwidth with predefined PRS configuration information, which includes physical/virtual cell ID, PRS carrier frequency indication (i.e. EARFCN (absolute radio frequency channel number) and PRS bandwidth), PRS muting pattern, PRS period, number of PRS subframes per PRS occasion. One example is shown in FIG. 2 for the existing PRS configuration with 4 subframes per PRS occasion and '1010' as the PRS muting pattern.

However, when the UE only can measure the PRS in partial PRBs and therefore requires more subframes per PRS occasion to improve accuracy, such configuration which uses the whole bandwidth will result in serious resource waste. To address this embodiments propose a PRS frequency hopping mechanism. This is particularly advantageous for UE's working with lower bandwidth such as MTC UEs but can be used for all UEs.

In this case, the cooperating cells used for OTDOA positioning could also operate in partial bandwidths and use corresponding broadcast and muting patterns.

The PRS configuration information transmitted between Node 1 and Node 2 and between Node 2 and UE in FIG. 1 could include one or more sets for PRS carrier frequency indications. One set indicates one group of PRS carrier frequencies, for example One set for PRS carrier frequency indication include partial or all of EARFCN (E-UTRA Absolute Radio Frequency Channel Number), PRS Bandwidth, PRS Configuration Index, Number of DL Frames and PRS Muting Configuration at least.

Or in an alternative solution, one set for PRS carrier frequency indication include partial or all of PRS frequency hopping pattern and hopping gap information.

The PRS frequency hopping pattern could be indicated by partial or all of following information, so as to align with the target narrowband UE:

Position of first narrowband

Offset, which is used to determine the other narrow bands

Number of subframes per hopping gap

Number of subframes per PRS block

PRS pattern in the first subframe where there are multiple blocks in the subframes Index of PRS frequency hopping pattern in a pre-defined PRS frequency hopping pattern table For the latter indication the standard might define a frequency hopping pattern table and in this case the frequency hopping pattern could simply be indicated by indicating an entry in the table.

Figure 3A:
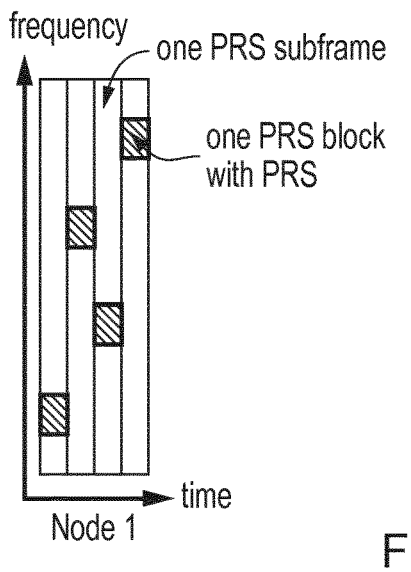
FIGS. 3A and 3B show PRS frequency hopping without a gap and with a gap according to an embodiment.
Figure 3A:
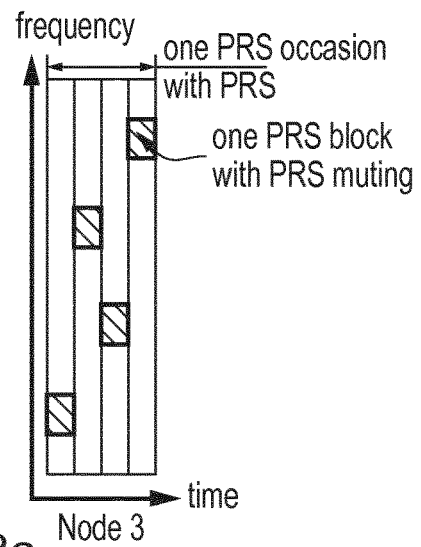

FIG. 3a shows node 1 broadcasting one PRS pattern in four subframes, while node 3 is muted in these subframes and transmits no data or PRS signals. Node 1 and node 3 are both broadcasting PRS signals to the same UEs and it is the difference in time between the UE's measurements of these signals that is use by the location server to determine the UE's position.

As shown in FIG. 3a subsequent PRS blocks in this embodiment hop by an amount equal to one bandwidth of a PRS block, which in many cases is the lowest unit of PRS frequency hopping in one PRS occasion.

One PRS block could include one or more PRBs (physical resource blocks) and be within one or more subframes and might have PRS signals or not, in this regard, there may be muted blocks corresponding to PRS blocks in neighbouring or cooperating nodes.

Figure 3B:
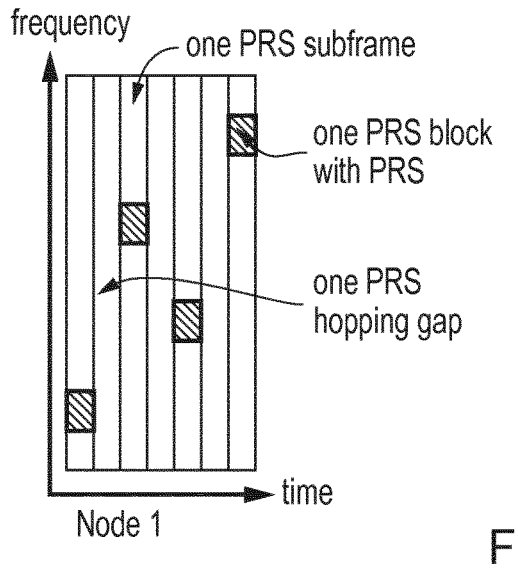
Figure 3B:
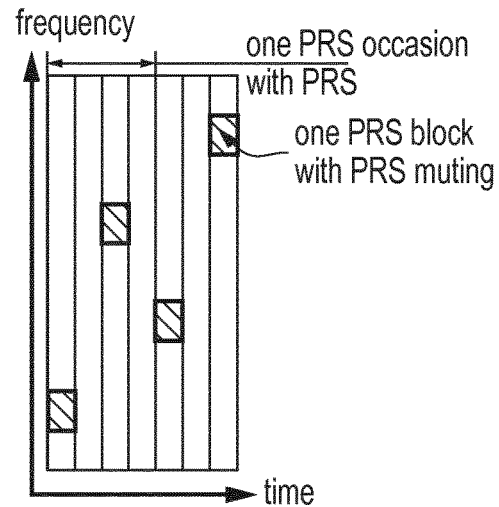

FIG. 3b shows a further embodiment, similar to that of FIG. 3a, but with a hopping gap between each PRS block. The hopping gap may be one or more subframes. This gap provides a time period in which the UE can adjust the frequency range of its receiver, to the new frequency.

Note that one node might have one or more PRS blocks in each subframe (see FIG. 5) and some PRS blocks might have PRS transmission but some PRS blocks might mute PRS (and data) transmission.

Figure 4A:
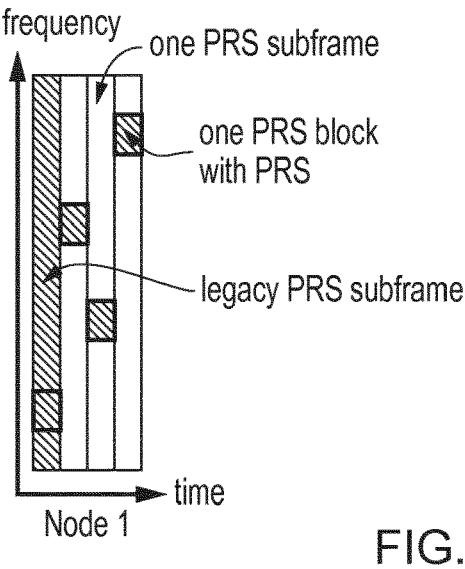
FIG. 4 shows PRS frequency hopping with legacy PRS in a first time period.

FIG. 4a shows an alternative embodiment, which supports legacy UEs by transmitting the legacy PRS signal in the first subframe. The signals in the first subframe could be used by legacy UEs and also by UEs adapted to the system of the embodiment as they may monitor a subset of the frequency range as illustrated by the block.

Figure 4A:
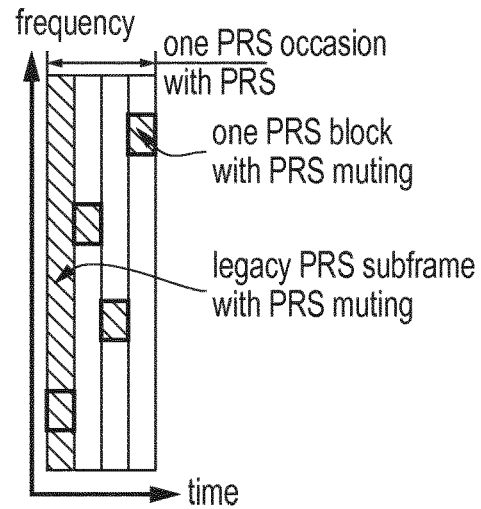
Figure 4B:
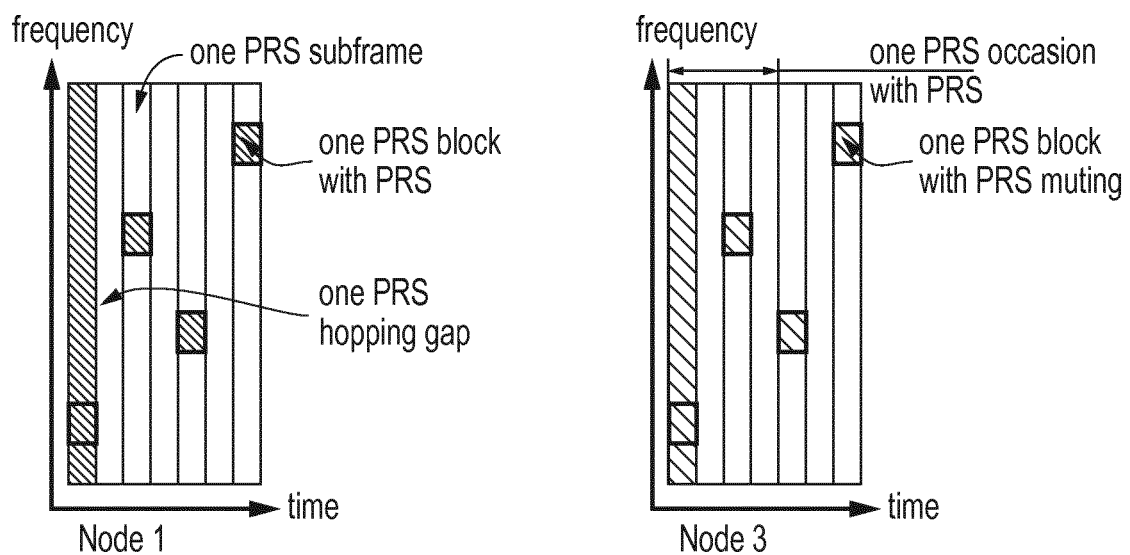

FIG. 4a shows the embodiment corresponding to FIG. 3a but supporting legacy UEs, which FIG. 4b shows the embodiment with the time gaps corresponding to FIG. 3b but again supporting legacy equipment.

Figure 5:
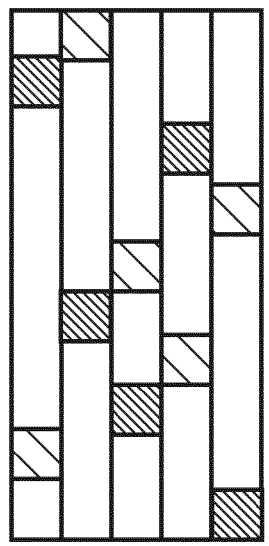
FIG. 5 shows PRS frequency hopping with multiple PRS blocks in each time period according to an embodiment.

FIG. 5 schematically shows an alternative embodiment, where two narrowband PRS block are broadcast in each subframe. Although they are broadcast rather than being transmitted towards a particular UE, the configuration information relevant to each set will have been transmitted to particular UEs, so one will adjust its receiver to receive the red set of PRBs while another will adjust its receiver to receive the yellow set. If a wideband UE is being served by this node then it might receive configuration information for both sets of signals and will adjust its receiver to receive both signals thereby improving its accuracy.

As noted above, the network nodes broadcasts PRS signals within PRS occasions and uses frequency hopping to increase the bandwidth while conserving resources. A location server, which may be located on one of the network nodes or may be within a control network node, will receive PRS configuration information from a number of network nodes involved in the positioning measurements for that particular area.

The location server will transmit the configuration information to particular user equipment and this allows the user equipment to monitor for the PRS signals broadcast by the relevant network nodes. The measurements performed at the user equipment consist of estimating the time offsets between the PRS signals received from different network nodes. It then reports these to the network node which forwards the information to the location server together with an estimate of the measurement quality. This allows the location server to determine the user equipment position.

As the network nodes use frequency hopping between PRS blocks transmitted within a PRS occasion, this information is transmitted in the configuration information to the user equipment allowing them to monitor the appropriate frequency bandwidth and receive the signal.

With regard to the behaviour at the UE, following receipt of the PRS configuration information, the UE determines the subframes and frequency bandwidths to monitor within each PRS occasion and monitors for these signals, it then estimate the time difference between the PRS signals received from different network nodes and transmits a response indicative of this time difference.

Where the working bandwidth of a UE is wide, perhaps 10 MHz, then for signals such as shown in the first subframe of FIG. 4A and in the subframes of FIG. 5, the UE can measure either the PRS in the whole bandwidth of the subframe for the signals of FIG. 4A or it may measure plural sub-blocks in different frequency bandwidths in the case of FIG. 5. For the FIG. 4A's case in subsequent subframes, PRSs in the partial bandwidths will be measured.

If the working bandwidth of the UE is smaller and corresponds to the bandwidth of the PRS blocks transmitted in the example of FIGS. 3 and 5 or in later subframes in the example of FIG. 4, then the UE will measure the PRS in these sub-blocks by adjusting the frequency of its receiver to cover this frequency band which is indicated in the configuration information. In this regard, during the first subframe of FIG. 4A it will measure a portion of the signal transmitted.

In the case of the signals transmitted as in FIG. 5, then such a UE will receive an indication of the frequency bandwidths of one set of the multiple signals and it will monitor for those. Another user equipment will receive an indication of the frequency bandwidths of another set of the signals and it will monitor for those. In this way, although only a narrowband signal may be transmitted, it is transmitted at different frequencies in different subframes and this increases the bandwidth of the overall signal and increases the accuracy of the measurements at the UE whilst still conserving resources.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method performed at a user equipment, said method comprising:
   receiving position reference signal configuration information from a location server, said position reference signal configuration information comprising:
     an indication of a position reference signal time period during which a plurality of position reference signals are to be broadcast from a network node, an indication of a first frequency band and a first time period within which a first of said position reference signals is to be broadcast, and an indication of at least one further frequency band and at least one further time period within which at least one further of said position reference signals is to be broadcast;
   monitoring said first and said at least one further frequency bands during said indicated time periods for said position reference signals; and
   transmitting a response to receipt of said position reference signals towards said location server via the network node,
   wherein a time period gap of a subframe or more between position reference signal blocks is provided where no position reference signals are broadcast and the user equipment is configured to adjust the frequency of a receiver to receive at least one subsequent position reference signal block at a different frequency, and
   wherein for one and the same position reference signal mode, using the same position reference signal transmitted at different frequencies.

2. A method according to claim 1, said method further comprising:
   receiving a plurality of position reference signal configuration information from at least one location server, each configuration information relating to a different network node;
   monitoring each of said first and said at least one further frequency bands during said indicated time periods for said position reference signals from each of said network nodes; and
   transmitting towards said network nodes an indication of a time of receipt of each of said received position reference signals.

3. A method according to claim 1, wherein said position reference signal configuration information further comprises an indication of a further first frequency band within which said position reference signal is to be broadcast within said first time period, and an indication of at least one additional frequency band within which one of said position reference signals is to be broadcast within said at least one further time period, said method comprising:
   monitoring each of said first, said further first, said at least one further and said at least one additional frequency bands during said indicated time periods for said position reference signals.

4. A method according to claim 1, wherein said user equipment is a low complexity user equipment with a narrowband transceiver, a bandwidth of said first and said at least one further frequency band each having a bandwidth equal to a bandwidth of said narrowband transceiver.

5. A user equipment comprising:
   a receiver configured to receive position reference signal configuration information from a location server, said position reference signal configuration information comprising: an indication of a periodically repeating position reference signal time period during which a plurality of position reference signals are to be broadcast from a network node, an indication of a first frequency band and a first time period within which a first of said position reference signals is to be broadcast, and an indication of at least one further frequency band and at least one further time period within which at least one further of said position reference signals is to be broadcast, said at least one further frequency band being different to said first frequency band;
   a processor configured to control said receiver to monitor said first and said at least one further frequency bands during said indicated time periods for said position reference signals; and
   a transmitter configured to transmit a response to receipt of said position reference signals towards said location server via the network node,
   wherein the user equipment is configured to adjust the frequency of the receiver to receive at least one subsequent position reference signal block at a different frequency during a time period qap of a subframe or more between position reference signal blocks where no position reference signals are broadcast, and
   wherein for one and the same position reference signal mode using the same position reference signal transmitted at different frequencies.

6. A non-transitory computer readable medium comprising program instructions for causing an apparatus to perform at least a method according to claim 1.

7. A user equipment according to claim 5, wherein each position reference signal time period is a number of subframes.

8. A user equipment according to claim 5, wherein a position reference signal time period is denoted a position reference signal occasion.

* * * * *